United States Patent [19]

McLeod

[11] 4,110,117
[45] Aug. 29, 1978

[54] COATING COMPOSITION

[75] Inventor: Gordon D. McLeod, Adrian, Mich.

[73] Assignee: Mobil Oil Corporation, New York, N.Y.

[21] Appl. No.: 626,624

[22] Filed: Oct. 29, 1975

Related U.S. Application Data

[63] Continuation-in-part of Ser. No. 559,750, Mar. 19, 1975, Ser. No. 542,837, Jan. 21, 1975, Ser. No. 532,152, Dec. 12, 1974, Ser. No. 409,067, Oct. 24, 1973, Ser. No. 284,099, Aug. 28, 1972, Ser. No. 283,964, Aug. 28, 1972, Ser. No. 107,578, Jan. 18, 1971, abandoned, and Ser. No. 75,306, Sep. 24, 1970, abandoned, said Ser. No. 409,067, is a continuation-in-part of Ser. No. 107,578, , which is a continuation-in-part of Ser. No. 75,306, , said Ser. No. 284,099, is a continuation-in-part of Ser. No. 107,578, , and Ser. No. 75,306.

[51] Int. Cl.$^2$ .............................................. C09D 5/10
[52] U.S. Cl. ................................ 106/1.17; 106/14.44
[58] Field of Search ......................... 106/1, 14, 287 SE

[56] References Cited

U.S. PATENT DOCUMENTS

| | | | |
|---|---|---|---|
| 2,450,327 | 9/1948 | Cogan et al. | 106/287 R |
| 3,392,130 | 7/1968 | Rucker et al. | 106/14 |
| 3,562,124 | 2/1971 | Leon et al. | 204/148 |
| 3,730,746 | 5/1973 | Boaz | 106/14 |
| 3,804,639 | 4/1974 | Trulsson et al. | 106/1 |
| 3,821,003 | 6/1974 | Dittrich et al. | 106/1 |
| 3,832,204 | 8/1974 | Boaz | 106/14 |
| 3,859,101 | 1/1975 | Slater | 106/14 |
| 3,884,705 | 5/1975 | Blair | 106/1 |
| 3,917,648 | 11/1975 | McLeod | 106/1 |

Primary Examiner—Lorenzo B. Hayes
Attorney, Agent, or Firm—Stevens, Davis, Miller & Mosher

[57] ABSTRACT

Improved zinc-containing coating compositions are useful to protect ferrous-containing surfaces. They are particularly useful and highly protective against red rust. The compositions with higher zinc content can be used to provide preferably a thinner coating. The compositions contain preferably; metallic zinc in particulate form, e.g., zinc dust or zinc flake; a polyol silicate a residual polyol or polyol polymer, and an inhibitor pigment selected from an alkaline earth chromate, a comixture of zinc chromate and one or more of the finely divided silicates, carbonates, oxides, hydroxides, and sparingly soluble compounds of magnesium and calcium, a comixture selected from a metal chromate$^{-3}$ compound which metal is not lower than iron in the electrochemical series-plus a sparingly soluble metal compound filler which metal is also not lower than iron in the electrochemical series. In substitution for or in conjunction with the chromate inhibitor a phosphate and or borate inhibitive pigment composition which metals are higher than iron in the electrochemical series can be used as a synergistic coinhibitive composition. These compositions can be incorporated in or reacted with the polymeric portion to reduce leachability. The coatings may even be used advantageously without zinc if use is next to or in contact with a zinc coating, either under or over the zinc coating as a composite coating, with cosynergistic protection. Finely divided inert extenders such as iron phosphide, may be incorporated in the composition; in such compositions comprising the inhibitor or coinhibitor pigment the zinc content of the combination can be lower without impairing the protective action provided by a coating of the composition. The polyol silicate is a solvent soluble polyol silicate, ester-exchanged reaction product of (1) an organic silicate consisting essentially of ortho silicate or siloxanes thereof having ester-exchangeable groups of 1 to 6 carbon atoms selected from the group consisting of alkyl, hydroxyalkyl, alkoxyalkyl, and hydroxyalkoxy alkyl, siloxanes thereof, and their mixtures, and (2) an aliphatic polyol which is ester exchangeable with (1). The residual polyol or polymeric polyol may be loosely or preferably unreacted with the silicate. The composition containing either zinc dust or zinc flake, or their blend, polyol silicate, polyvinyl butyral, and strontium chromate is a preferred composition as it can provide very highly protecting rust-free thin coatings of 0.05 to 0.2 or 0.3 or 0.5 mil dry thickness, that offer the advantage of a preconstruction weld-thru coating having improved flexibility for forming operation processes.

10 Claims, No Drawings

COATING COMPOSITION

This patent application is a continuation-in-part of my patent application U.S. Ser. No. 559,750 filed Mar. 19, 1975 and patent application Ser. No. 542,837 filed Jan. 21, 1975, U.S. Pat. Ser. No. 532,152 filed Dec. 12, 1974 and U.S. patent application numbers 409,067, 284,099, 283,964, filed Aug. 28, 1972,107,578 and 75,306. Application Ser. No. 409,067, filed Oct. 24, 1973, is a continuation-in-part of application Ser. No. 107,578 (now abandoned) filed Jan. 18, 1971 and the latter application is a continuation-in-part of application Ser. No. 75,306 (now abandoned) filed Sept. 24, 1970. Application Ser. No. 284,099 filed Aug. 28, 1972 is a continuation in part of application Ser. No. 107,578 and 75,306. The disclosure in these patent applications is hereby incorporated by reference in this application.

This invention relates to self-curing coating compositions and particularly to novel coating compositions that can be applied to a ferrous surface to form a coating, i.e., film that provides exceptionally long-life protection from rusting of the ferrous surface. Some of these compositions contain a very low percentage by weight or by volume of metallic zinc as zinc dust, zinc flake and these compositions provide on the ferrous surface a highly protective cured film having a very low metallic zinc content. Other compositions have a higher zinc content and these can be used to provide a thinner film on the ferrous surface that imparts such protection and even flexibility and may be used as an anti-rust primer to iron surfaces that may undergo forming, bending and welding and later be coated with a similar coating or organic topcoat. Still other compositions of the present invention contain zinc flake, as the metallic zinc of particulate form in the composition instead of zinc dust, or in addition to it and these compositions can be used to form on ferrous surfaces a very thin film that provides this protection from rusting.

The coating compositions of the present invention contain; metallic zinc in particulate form, e.g. zinc dust or zinc flake; a polyol silicate; a residual polyol or polyol polymer; a coinhibitive protective (against red rust) pigment which protects in synergistic combination with the zinc, said inhibitive pigment being selected from a chromate composition (selected from an alkaline earth chromate, a comixture of zinc chromate and one or more of the finely divided silicates, carbonates, oxides, hydroxides and sparingly soluble compounds of magnesium and calcium, a comixture selected from a metal chromate $^{-3}$ compound, said metal being not lower than iron in the electrochemical series plus a sparingly soluble metal compound filler which metals are not lower than iron in the electrochemical series. The coating may be used advantageously without containing zinc if it is used next to a zinc coating-either under or over the zinc coating.

The polyol silicate in the coating composition is a solvent-soluble, polyol silicate ester-exchanged reaction product of: (1) an organic silicate consisting essentially of ortho silicates or siloxanes thereof having esterexchangeable groups of 1 to 6 carbon atoms selected from the group consisting of alkyl, hydroxy alkyl, alkoxyalkyl, alkoxyalkyl, and hydroxyalkoxyalkyl, siloxanes thereof, and their mixtures; and (2) an aliphatic polyol which is ester-exchangeable with (1). The residual polyol or polyol polymer may be loosely reacted with the silicate in such a manner as to not cause gelation which occurs if too many OH groups on the polyol over-crosslink and polymerize the silicate or the polyol polymer may be unreacted with the silicate.

The coating composition of the invention contains, based on the composition without the liquid organic vehicle, between about 4 and 95% by weight of said metallic zinc, between about 1 and about 80% by weight of said inhibitive or coinhibitive pigment,(the chromates being preferably lower than about 15%) and between about 1.5 and about 70 weight % of said aliphatic polyol silicate and up to 90% of the residual polyol polymer. Each inhibitive pigment has its optimum range of composition as may be demonstrated by the examples given herein, and may vary in conjunction with the type and amount of synergistic fillers. The compositions of chromate coinhibitor and filler and other inhibitive compositions of this invention may be used without the zinc if used under or over a zinc containing coating for protective action against red rust and if used over said zinc coating may be used also to add color and beauty to the gray zinc film in addition to extending its life. Color pigments which do not destroy the passivation effect of the chromate and other inhibitor coinhibitors or interfere with the zinc protection can be used. These also can be made into single package compositions which can be used over the zinc or may be used with a smaller amount of zinc to achieve the color as is desired.

When the composition contains zinc dust as the metallic zinc ingredient, it is preferred that the zinc dust have an average particle size of less than 10 microns. Suitable zinc dust includes dust having an average particle size of 0.5 micron to 20 microns. It is especially preferred that the zinc dust have an average particle size between about 2 & 5 microns. Of course, the zinc dust that is used conventionally has some zinc oxide on its surface. Relatively pure zinc dust is commercially available and it is preferred. Other zinc dusts that are available contain some copper, and metals lower then iron in the electromotive series such zinc dust is less preferred because it does provide a coating, from the coating composition, that has less protective action. When the metallic zinc in the coating composition is zinc flake, it is preferred that it has a particle size of finer than 32 mesh. The zinc flake is preferably a non-leafing type. It is flake and is made preferably by ball milling dust or powder of zinc or its alloy with metal higher than iron in the electromotive chemical series, such as aluminum and magnesium, in the presence of a lubricating and protective (against oxidation) solvent such as a higher boiling yet volatile aromatic solvent.

Strontium chromate and calcium chromate or zinc chromate-plus the silicates and carbonates of magnesium and calcium (as coninhibit or) are preferred chromate inhibitor compositions. Certain of the other inhibition compositions e.g. barium neta borate, calcium boro silicate, zinc phosphate may be used synegistically with certain of the chromate inhibitive compositions as shown in certain of the examples. In the coating compositions there may be present along with the chromate composition, other compounds of strontium, calcium and barium. These compounds include a carbonate, silicate and oxide, for example, oxides, carbonates and silicates of calcium and magnesium. These compositions can contain a small amount of chromic acid, added as aqueous chromic acid solution, and in that case the composition includes one of the chemical compounds of strontium, calcium and barium, e.g., their oxide, or carbonate or in the case of barium the sulfate. Other inhibition pigments include PbO, red lead plus calcium or magnesum carbonate, or calcium or magnesium silicate, barium meta borate, & calcium-boro-silicate. These latter coinhibitors are inferior.

The inhibitive co-pigments are desirably used in the form of the commercially available very finely divided pigment grade. As mentioned above, the coating composition contains polyol silicate compositions that are soluble in a solvent. For single package compositions which contain polyol silicates in which some polyvinyl alkylal or other polyol polymer is dissolved therein. The preferred ratio of polyol to silicate is in the range of 0.3 to 1.8 moles OH in the polyol per mole monofunctional ester exchangeable grouping in the silicate-with the optimum for single package compositions being a ratio of about 1 mole OH in the polyol per each alkoxy (or mono-functional grouping) on the silicate. If the polyol contain numerous OH groups then the basis should be on the number of monofunctional groupings on the silicate being replaced by polyol OH groups, since many of the OH groups on such polyols will be sterically hindered from reaction with the silicate and only 100 the groups will be reacted prior to the zinc addition which then inhibits further reaction of the OH groups and silicates This latter way of expressing the broad range of polyol/silicate composition would then be that the reaction product has more than 15 and less than 90% of the monofunctional groupings (silicate replaced by polyol containing compound groupings, although even all of said grouping can be replaced by polyol, although this is not preferred. Examples of polymeric polyols include, the polyvinyl alkylals, which are solvent soluble, poly alkylene polyols, etc. Residual polyols may include pentaerythritol, hexylene glycol, sorbitol etc, and other solent soluble hydrophilic compounds having more than one OH grouping and which do not volatilize from the film. The polymeric polyols, which are those polymeric materials which contain more than one OH grouping per molecule may often advantageously be made conductive by reacting with an acid or acid salt prior to neutralizing with a metal compound higher than iron in the electromotive series, to remove said excessive acid. In this manner inhibitive compositions can be incorporated in the polymeric portion to reduce leachability. The lower polyol/silicate reange allows more solubility in hydrocarbons which are not aromatic, and in single package compositions there is less tendency to gas. Such polyol silicates useful in this invention are described in detail in my said patent applications mentioned above and incorporated herein by reference. Some good formulations contain high ratios of residual polyol or polyol polymers. Preferred polyol silicates for use in the coating compositions of this invention are thus obtained by reacting the aliphatic polyol, in a sufficient amount to cause rapid curing of the coating composition, with an ortho silicate or siloxane thereof, such as alkyl silicates having less than 70% hydrolysis, preferably less than about 50% hydrolysis and even preferably less than 40% hydrolysis. The aliphatic polyol reacted with the organic silicate may advantageously be a polyol containing as a major portion of ethylene glycol propylene glycol or glycerol. Especially preferred is ethylene glycol as the aliphatic polyol While in every instance at least one of the OH groupings on the aliphatic polyol is reacted with the silicate, the polymeric polyols and polyols having many OH groupings may have only one or no OH groupings reacted with the silicate. Excessive acid catalyst and heat cause excessive reaction of many of the OH groupings on polymers such as polyvinyl butyral and the silicate to cause excessive crosslinking and gelling. Neutralization of the acid prior to excessive crosslinking takes place prevents this from occuring. The preferred range of polyvinyl butyral or other residual polyol in the cured dry coating is between about 0.1 and 12 weight % based on the film residue after curing.

As mentioned above, the coating composition of the invention includes a liquid organic vehicle. The organic vehicle is a solvent or diluent for the polyol silicate, other polymers and allows easy application of the paint to produce a homogeneous film which on drying does not separate and allows adsorption of moisture from the atmosphere to accelerate curing. Such suitable solvents include compatable alkoxyalkanols, hydrocarbons, oxygen and nitrogen containing solvents, alkanols etc. which singularly or together will dissolve said organic ingredients, keep them in a stable active state for rapid curing when applied as a coating. These solvents have boiling points below about 200 C., are non-gelling and are of the paint solvent type. The alkoxyalkonals, hydrocarbon and nitro solvents keep the zinc particles from agglomerating together on long standing. The liquid organic vehicle is present in the coating composition in an amount sufficient to provide a satisfactory coating film on a ferrous surface by conventional application techniques, such as by air spray, airless spray, and electrostatic spray or by dip, brush, roll or flow application.

The coating composition of the present invention may included in addition to the ingredients recited above, one or more of various additives known to those heretofore used in protective coating compositions. These include color pigments reinforcing pigments and extenders, thixiotropic agents, antisag agents, such as pyrogenic silica, kaolin, montmorillonite, bentonite, wetting agents and other cathodicaly active metals such as magnesium powder and aluminum powder. The preferred nonreactive (inert) diluent ingredient is Ferrophos, which is ferrous phosphide ($Fe_2P$). Ferrophos has an average particule size of between 0.5 and 10 microns. It is preferred the Ferrophos used in the composition of the present invention have an average particle size of less than 5 microns.

A zinc-rich paint of the prior art has been defined as a paint in which at least 85% of the total nonvolatile film portion is zinc dust. Many thousands of tons of zinc rich paints of this type have been used each year on ferrous surface of bridges, autos, ships, off-shore installations, preconstruction steel etc., i.e., on ferrous surfaces that will be exposed to corrosion. The primary theory for functioning of the organic bound zinc rich paint has been that the zinc particles touch each other to have a substantially galvanic connection to the substrate surface, e.e., ferrous surface, and thereby allow the zinc to sacrifice itself to corrosion instead of the iron. In these organic-bound paints, often the zinc particles become surrounded by the organic binder and are insulated and lost from the coatings galvanic protective action, and hence these types of zinc coatings are not as active or long-life in protection against rusting at equal zinc content and film thickness, when breaks occur in the film, as are the inorganic porous-type conductive zinc coatings where all zinc is available for sacrifice.

In one aspect of the invention the composition is made as a single package that is easily applied to provide aircured or heat-cured coatings having physical characteristics ranging from those of inorganic ceramic types of film to flexible, partly organic silicate films, while at the same time having the adhesion, toughness, and flexibility of excellent chemically-cured organic binders.

There are three main types of inorganic zinc silicate coatings of the prior art that are described in U.S. Pat. Nos. 3,130,061, 3,320,082 and 3,056,684. These are the post (or self) cured lead-zinc silicate type, the self (or post) curing water-based silicate type, and the self curing ethyl silicate type. All of these semiporous types are virtually an electric cell of zinc-iron with moisture or salt water being the electrolyte, so that whenever moist corrosive conditions contact the coating the zinc sacrifices itself building up oxidation products to passivate the steel and to slow down the galvanic cell activity as the coating ages and by stifling electrolyte penetration. This type of coating needs to have the zinc particles close together, but it is not necessary to have them touching. In order to slow down the moisture penetration and high electrical degradation, due to the cell activity of this porous inorganic zinc coating, over ferrous surfaces, the thickness of the coating, for long life, must be over at least 2 and preferably about 4 mils. With such thickness of the coating, electrolyte penetration is low and the zinc oxidation products are better locked in to passivate the steel surface so as to slow down cell activity. Once the zinc is used up the steel surface starts rusting. In the prior art many methods have been devised to improve the life of such coatings such as mixed lead zinc silicates and phosphoric acid post-curing. Many proprietary formulations were devised comprising many neutral and plately fillers such as clays, talc, calcium carbonate, mica, etc. to help locking in the zinc and zinc oxidation products acting as passivators and to stifle electrolyte penetration into the zinc film to improve film rust-free life. Another recent improved technique has been to increase the contact of the zinc and steel and the same time passivate the ferrous substrate (and zinc) in using chrome compounds resulting from chromic acid and zinc as part of the film nearest the steel, however, these compositions while functioning very well to passivate and protect the steel have been described in the patent literature to be heat cured at relatively high temperatures and applied as very thin coatings. They are not an easy-to-use single-package stable composition for easy application, rather, they have to be applied by industrial processes wherein the coating is applied to a specially-prepared substrate. The film is then heat cured and subsequently topcoated with a conventional zinc-rich paint. These compositions are described in U.S. Pat. No. 3,819,425 and German applications Nos. 2352143, 2352130, 2352104 and 2352150 as chromic acid-zinc, water-based compositions with multi-step heat curing processes for their applications. Numerous other references on paint comprising corrosion (rust) inhibitive inorganic pigments with partially hydrolyzed silicates (see U.S. Pat. No. 2,450,327) in which hydrolyzed ethyl silicate, mica and a heat-resistant, corrosion-inhibitive inorganic pigment, such as strontium chromate, chrome green, zinc yellow, and barium chromate have been used.

U.S. Pat. Nos. 3,653,930 and 3,730,746 teach chromates but no definition is given of the chromate type. Many metal chromates have been tested in the development of the composition of the present invention. Only those mentioned above have been found to be satisfactory in coating compositions containing my novel polyol silicate and metallic zinc.

Barium meta borates use in some paints is taught in U.S. Pat. No. 2,818,344, Canadian Pat. No. (1958) 561,978. Its use in certain zinc paints is also taught in Japanese Pat. No. 48,44322 granted June 26, 1973 and Dupont U.S. Pat. No. 3,287,142, however the use in polyol silicate self-curing zinc primers with additional chromate inhibitors and fillers have not been taught. The highly preferred compositions of this invention include (1) strontium, calcium or magnesium chromate plus the polyol silicate plus the zinc plus the polyvinyl butyral; (2) zinc chromate plus alkaline earth fillers such as talc, asbestos, calcium and magnesium silicates and carbonates, plus zinc plus the polyol silicates and optionally residual polyol polymers. These preferred combinations which we have found to be so superior have not been taught or known heretofore. In addition the preferred range of composition which we found necessary with the polyol silicate and poly vinyl butyral and the use with finely divided iron phosphide as a coextender for novel weld-thru primers has not been known. Further the use of this coinhibitive pigment combinations with the flexible type modifications of the polyol silicates with polyol polymeric materials with the zinc to form very thin but highly protective coatings that will undergo forming have not been taught prior to this application.

The coating composition of the invention may be as a single package containing all ingredients or as two or more packages. One package in the two-package product comprises the polyol silicate and the chromate composition or inhibitive filler compound homogeneously dispersed in the liquid organic vehicle and a mixture of the metallic zinc and Ferrophos as the second package. The two packages are mixed prior to the use as a paint. The ferrophos can be added to either package. If zinc flake is used as the zinc the composition may be either a single package or 2 package system with the polyol silicate binder and inhibitors as one package and the zinc flake and possibly some hydrocarbon or ketone solvent as the second package to be mixed prior to use. It is understood that conventional suspending agents, solvents, antisag agents, small amount of fillers, and other common paint additives may be added to either package.

The self-curing coating compositions of the invention are direct substitutes for, but with improvements over, galvanized metal with the added advantage that the coating can be applied by dip, brush roll, airless or air spray and at much thinner thicknesses than have been previously possible for adequate protection by using conventional known inorganic zinc, or zinc rich coatings, and yet have highly unexpected long galvanic protection.

Heretofore zinc-rich paints had to be applied to ferrous article to obtain a film or coating having a thickness of at least 1 mil, and inorganic zinc silicates at least 1, preferably 2 or even 3 to 4 mil to obtain good corrosion resistance in long salty exposure for coated ferrous surfaces. The thick coating caused pinholing and bubbling of topcoats and prevented coating of precision parts for which a thick coat often was uneven and the coating thickness adversely affected the dimensions of the precision parts. In addition, the articles to be coated were often of a shape that could not be sprayed and yet were too big to be easily galvanized. These articles required a thin even coating that had the protective life of galvanize. They require a very thin coating of only 0.05 to 0.2 to 0.5 mils that was easily and more accurately and evenly applied. Ordinary 0.2 mil scored coating from conventional zinc-rich paint lasted only a day in the salt fog. Inorganic zinc coatings, which are 0.1 to 0.2 mil, lasted only overnight in the salt fog. Thus there has been a real need for composition of the present invention that can provide highly protective thin coatings.

Known processes using compositions of the prior art involve difficult-to-use techniques not at all applicable to the maintenance painter, ship or tank painter, who must rely on easy-to-use products which self cure, which are ready to use right out of the can, and which do not require complicated multi-step processes having special curing techniques. It is therefore a primary object of this invention to provide compositions which have valuable chromate-steel surface passivation effects or other passivation inhibitions with the zinc and also have the valuable ease of use, by any painter in the field, by just opening the can or simply mixing a single or 2 package system and applying. Further those invention compositions are far more versatile and highly protective at thicknesses from 0.1 to 20 mil with out mudcracking, whereas conventional zinc silicates of the self-curing types have to be applied at less than 4-5 to limit mudcracking and do not give adequate protection at a coating thickness of less than 1 mil. The pot life of conventional types of coating compositions is only a few hours, whereas compositions of the present invention have a pot life of months or years.

The compositions of the invention are particularly useful as zinc coatings that provide long-life galvanic protection against rust when cured on ferrous substrates-at very low metallic zinc content in a thick film or coating or at higher metallic zinc content in a very thin, cured film. In either case, the composition is a less expensive coating with equivalent or improved protection. The composition can provide a very thin protective coating for high dimensional-tolerance steel shapes for which a thick coating is not suitable. The low-zinc coating compositions of the invention are especially useful since they can be diluted in zinc content by the incorporation of more weldable fillers, such as iron phosphide, or can be simply applied as thinner coatings that are more tolerant of either spot (resistance) welding or submerged-arc welding types, without burnback, with a mininum of problems due to increased porosity, volatilization of the zinc, and difficulty in striking of the weld. In the case of resistance welding the film from the composition provides improvements such as welds of higher shear strength, negligible electrode wear and nugget size after thousands of continuous welds, and less zinc fumes, simply because less zinc coating is necessary for protection against rust when using self-curing coating compositions of the present invention.

The zinc-coating compositions of the invention cure rapidly enough to use as a preconstruction primer adhering to shotblasted cold-rolled or pickled steel plates, beams, etc. to provide antirust protection to the steel until used, and even thereafter in the erection of a boat, bridge, building, etc. The final steel construction can be repainted, without or at most a minimum of further surface treatment, using the coating composition of the present invention or using a conventional compatible zinc coating composition or an organic topcoat composition, such as epoxy polyamide, acrylic, acrylic-water-based, vinyl, polyester, epoxy powder coating compositions or using other compatible organic topcoat or porous inorganic topcoat comprising the polyol silicate of this invention, and other fillers and colored pigments.

Some of the compositions of the present invention produce semiflexible, adherent, zinc-containing, coil coatings that are galvanically protective and undergo conventional forming operations with a minimum of film breakage and adhesion loss and will adhere either to conventional steel, chrome-passivated steel, etched steel or to epoxy-zinc coating over ferrous surfaces and said coatings of this invention will accept, without problems, conventional topcoats that are stated above.

The compositions of this invention that contain all five ingredients (i.e. zinc, polyol silicates, residual polyol polymer, inhibitive pigment combination, and solvent vehicle) are either provided as a multi-package or most preferably as single pkg. They provide a self-curing, long-life protective coating to ferrous substrates. Using a composition of polyol silicate, strontium chromate, and zinc flake, the coating with a thickness of 0.05 to 0.3 mil provides a highly superior rust-resistant coating that is easy to apply. It provides a coating that acepts topcoats without the pinholing or blistering that is a common problem of inorganic zinc silicate coatings.

It is not known what makes the coating perform so well in corrosive neutral moist and salty atmospheres for long periods of time—when the coating is so thin but films properly evenly applied as thin as 0.1 mil, perform quite well for years outside and a 0.2 mil coat will survive over 2,000 hours in the ASTM B117 salt fog test with no rusting.

The aspect of the composition of the invention, containing zinc flake as the metallic zinc in particullate form, is particularly useful as a thin weld-thru preconstruction primer, since the coating is so thin there is no hold-up in continuous arc welding and there is produced greatly reduced zinc fumes. In spot (resistance welding these extremely thin coatings exhibit no burnback from the weld and provide welds with higher shear strength, negligible electrode wear and nugget size after thousands of continuous welds with less zinc fumes and less weld porosity, simply because the welding is through a thinner zinc coating. Another advantage is that the zinc flake pigment properly compounded as described in the example herein does not settle out hard in the polyol silicate and as a single package allows marketing very inexpensively a direct galvanizing substitute for the ship construction yard, the marine and maintenance painting contractor and even the home handyman, the small precision steel parts producer, and the maintenance touch-up painter. The coating applies so evenly there is no need for concern about excessive thickness. The films properly prepared and applied, as thin as 0.2 to 0.3 mil dry film thicknesses, are protective for 2,000 hours in the ASTM B117 salt fog accelerated corrosion and films as thin as 0.05 to 2 mil, dry, are protective over steel for years outdoor exposure in Adrian, Michigan atmosphere, without rusting or rust undercutting. The coating from the composition containing polyol silicate and zinc flake is silvery and looks like galvanized coating and hence is an attractive coating for wherever a galvanized coating is now being used. The coating can be applied at temperatures ranging from 0° to 120° F.

Organic modifying additives, particularly polyvinylbutyral, other residual polyols and polyol polymers or similar materials containing more than one OH grouping per molecule can be used alone with or if non-gelling reacted with the polyol silicate. Of course, at least about 1% by weight of an inhibitor, preferably a chromate or larger quantities of other inhibitive pigments is present in the coating composition. The ratio of silica, deposited by the polyol silicate in the cured film to zinc flake can be much higher than for conventional alkyl silicate - zinc dust paints. When zinc phosphate, barium metaborate and calcium boro silicate are used as inhibitors they are preferably used in conjunction with a chromate in the zinc-polyol silicate, polyol polymer and vehicle compositions, they are present in an amount dependent on the thickness of the film and the presence of other fillers and inhibitors. When used without other inhibitors they are most suitable when present in substantial amounts of 5 to 45% of the coating solids. Volume % is not accurate. This is particularly true of the zinc phosphate. When strontium chromate inhibitor is added to another inhibitor such as barium meta borate the amount of white zinc rust is diminished in the polyol silicate zinc film on exposure for long periods in salty atmospheres. The use of the chromate inhibitor with the other inhibitors allows lower levels of composition of these in the cured film for identical performance at the same zinc content. The combination of zinc chloride in minor amounts of 0.03 to 0.5 % by weight of the binder acts synergistically with chromate inhibitor and even with very small amounts of green chromium oxide and larger amounts of the strontium chromate, to give exceptional protection for extremely thin films if applied right after mixing or a 2 package system. This effect was entirely unexpected since chlorides are well known passivation eliminators even in small amounts. The presence of organic soluble salts of weak acids such as maleic and succinic acid destroy the passivation effect of the chromates in these polyol silicate -zinc compositions. The single package formulations-comprising the zinc chloride are inferior since the protective action of the chromate in the polyol silicate zinc formulations is diminished greatly on aging when zinc chloride is present in substantial amounts.

The red lead and PbO are inferior inhibitors to the chromates and are more effective with substantial chromate.

The following illustratively describes, as examples A, B, C, D, and E some of the preparation of the polyol silicate used in some of the coating compositions of the present invention. Other examples containing larger quantities of the polyol polymer are also given, in other examples.

In a glass lined reactor (75 gallon capacity) a mixture of 186.36 lbs. of ethylene glycol and 226.4 lbs. of ethyl silicate 40, 5.61 lbs. of 2-ethoxy-ethanol and 40 ml. of 20% aqueous sulfuric acid was heated to 105° C. when refluxing commenced. After reacting 20 minutes, the mixture was cooled to 80° F and 10 lbs. methanol was added to provide polyol silicate A that had a gravity of 1.048 at 32.5° C. and a yellow color. It was a clear liquid containing 22.4 silica as $SiO_2$.

A mixture of 172.4 lbs. of condensed ethyl silicate, containing 95% monomer and 5% dimer and having a silica ($SiO_2$) content of 28.4% by weight, and 87.9 lbs. of ethylene glycol was heated to reflux (95° C.) in the presence of 8 ml. of 20% aqueous sulfuric acid in the glass-lined reactor (mentioned above). After refluxing, the mix was cooled to 90° C. and then 110 lbs. of toluene and 14.1 lbs. of methanol are added, followed by the addition of 19 lbs. of polyvinyl butyral while stirring. (The polyvinyl butyral had a hydroxyl content expressed as polyvinyl alcohol of 9 to 13%, and an average molecular wt. of 36,000, and was known as Butvar B 79 made by Monsanto Chemical Co.). The reactant were again heated to 80° C. and cooled to provide polyol silicate B.

Polyol silicate C was prepared by reacting at 95° C., 2100 g. of ethyl silicate 40 having a silica content of 42.6%, 744 g. ethylene glycol, 306 g. 2 ethoxy ethanol and ½ ml. conc. 37% hydrochloric acid to form a stable concentrate -esterexchange product, having 28% silica and being stable for a period over 3 years. To 1000 ml. of this concentrate was added 2000 ml. of toluene and 60 g. polyvinyl butyral and reacted and dissolved at 85C. This stable paint vehicle resulting was used to make single package and 2-package paints as described in examples.

Polyol silicate D was prepared similarly but using a lower ratio of ethylene glycol to silicate to produce more hydrocarbon soluble vehicles. Thus 1400 g. of Ethyl silicate 40, 465g. ethylene glycol, 520 g. 2-ethoxy ethanol and 0.5 ml of 37% hydrochloric acid were heated to 105° C. to produce a hazy concentrated polyol silicate ester exchange product having 25% silica. Similar concentrates were made at increased weight ratio of glycol/Ethyl Silicate 40 as follows: 1.1/3, 1.2/3 and 1.3/3. Also similar binders concentrates were prepared using Ethyl Silicate 40 hydrolyzed to 45% and 48%, with the finding that the higher the ratio of glycol/silicate the faster the coating cured and also the higher the hydrolysis the more rapid the coating cured. The higher glycol/silicate ratios and higher hydrolysis reduces solubility in paraffinic solvents however and requires more aromatic and polar solvents to effect solution without gelling, particularly when substantial amounts of polyvinyl butyral are present in binder. Increasing the acidity by 5 fold increased the binder reactivity. The first concentrate was diluted with 2 volumes of toluene and sufficient polyvinyl butyral added to produce the 2% concentration, heating to 85 C. to produce Polyol Silicate vehicle D.

Polyol Silicate E was prepared by heating 3600 g. ethyl silicate 40, 1200 g. ethylene glycol, 11,000 g. 2 ethoxy ethanol and 6 ml of 30% sulfuric acid, heating to 138 C. while removing by fractional distillation alcohol released from the reaction. 460 g. polyvinyl butyral was dissolved and reacted therein at 85 C. The resultant product polyol Silicate E had 10% silica and a closed cup flash point of over 104 F. Single component paints were made as given in examples

EXAMPLE 1

One hundred wt. parts of polyol silicate B, 4 wt. parts of strontium chromate (jet milled), 50 wt. parts of zinc flake (minus 325 mesh and made by ball milling zinc dust in aromatic solvent dispersion), 100 wt. parts of toluene and 5 wt. parts of mixed nitropropane solvent were mixed to form a coating composition.

This coating composition was stable for several months without hard settling yet gave a good hard adhesive coating which had exceptional life in the ASTM B117 salt fog test even at a 0.2-mil, dry-film thickness and provided excellent weld-thru properties. In addition, exposure(south with tipping at a 45° angle) to atmospheric conditions (the Adrian Michigan, atmosphere) for 10 months produced no rusting of any kind to a 0.1-mil dry film on scores, cold-rolled clean steel.

EXAMPLE 2

The polyol silicate A, which leaves no residue other than silica, since it had no residual polyol such as polyvinyl butyral in it, was used to make a composition otherwise the same as Example 1. The salt fog test of this composition showed the desirability of using the residual polyol in the preparation of the polyol silicate.

It was found that the more polyvinyl butyral in the polyol silicate the better the salt fog antirusting characteristics (with relatively high strontium chromate content) of the zinc flake coating composition. This shows the value of the residual polyol; however, it was noted that if the residual polyol content (polyvinyl butyral content) of the dry-cured film was much greater than about 7% (e.g., 20%) the chemical and solvent insolubility resistance was greatly impaired. This was because such coating was soluble in certain solvents. At lower ratios the coating was insoluble. While the insolubility of the coating is important in some applications, it is unimportant in others, thus the range of residual polyol can be adjusted to fit the needs of the final use of the coatings. It was also noted that the degree of reaction of the polyvinyl butyral and silicate was dependent on the amount of strong acid catalyst e.g. HCl present. At high levels of catalyst the poly vinyl butyral and silicate may over condense to gel at high temperatures, possibly thru excessive crosslinking, however prior to gelling the acid can be neutralized by addition of a basic filler so that the reaction is stopped. It was also noted that sufficient alcohol or monofunctional OH compound must be present to also inhibit gelling.

It was found that zinc chromate was not nearly as effective as strontium chromate in the coating composition of the invention unless a coinhibitor or coinhibitors are present such as Ca and Mg $-CO_3$ and silicate. A coating composition using basic zinc chromate was substantially poorer in preventing rust than a comparable coating composition without any chromate composition.

In the absence of strontium chromate or other chromate composition in the coating composition, a thin film in the ASTM B117 salt fog test starts rusting in 1 or 2 days but with only a 0.2-mil thickness of the coating composition containing strontium chromate there was no rusting after several months.

EXAMPLE 3

Using polyol silicate B, a series of coating compositions were prepared identical to Example 1, except that 6, 8, 10, 12, 15, 20, 40 wt. parts of strontium chromate were used instead of the 4 wt. parts used in Example 1. The compositions provided coatings with excellent rust prevention, particularly as thin films for which the higher chromate content is preferred. In another series the zinc flake content was doubled with excellent results. Much less zinc flake is necessary than similar coatings using zinc dust. If the strontium chromate was left out of the coating composition, rusting occurred rapidly in ASTM B117 salt fog test; the coating failed in as little as 2 days when it was 0.05 to 0.1 mil dry film thickness on clean cold rolled steel. The composition, as a coating of such thickness, protected for more than 2 months if the strontium chromate was present.

Coatings of compositions of this invention prepared with zinc flake were directly compared with those made with zinc dust. Such coating on steel panels were exposed to the atmospheric and to the ASTM B117 salt fog exposure test. It was found that on a thickness basis zinc flake is about 3 times as protective as zinc dust. Coating compositions with zinc flake or zinc dust do not perform well as thin coatings unless the chromate composition is also present. Zinc flake films are highly protective down to 0.05 to 0.2 mil thickness whereas the zinc dust films need to be about greater then 0.4 mil thickness to be as protective. Zinc flake films are less flexible and hence will not undergo forming as well as zinc dust coatings at the same thicknesses. Zinc flake gives superior coverage and works best at low levels (i.e., 1–5 lbs. of zinc/gal. of paint, i.e., of coating composition), whereas zinc dust is desirably present in a content of at least 3 lbs./gal. and appears to work much better when an inert extending filler, such as iron phosphide, is also present in the film.

It is not clearly understood how these three ingredients of my coating composition perform to make such a highly protective coating, even as a very thin coat. It is thought that the strontium chromate or other chromate composition in the presence of metallic zinc and my polyol silicate functions in a dual role—that of creating a cell that has excellent electrical contact with the steel surface to sacrifice the zinc as necessary, to protect the steel from rusting, and even more important to passivate the steel (or other ferrous) surface so that the electrical flow is just sufficient to protect the steel surface so that the coating functions much longer than conventional coatings.

The coatings of this invention can be applied over clean steel, cold rolled steel, etched steel, pickled steel, chromiczinc passivated steel, sand, shot or water blasted steel, over or under inorganic chromate inhibitive compositions including those containing polyol silicate with and without metallic zinc, or over coatings from solutions of chromic acid in colloidal silica solutions containing the alkaline earth carbonates, silicates and oxides. The coating compositions of the invention are particularly useful to retard rusting by a touch-up painting of old zinc-coated surfaces, and by painting over inhibited surfaces after blasting. The polyol silicate coating when polyvinyl butyral is present adheres well to epoxy zinc coatings, inorganic zinc silicate coatings of all kinds and even over porous ceramic coated steel surfaces. With rusty surfaces a wetting agent plus substantial inhibitor is advisable to penetrate the rust.

EXAMPLE 4

To show the effect of various contents of strontium chromate in the coating compositions of this invention as cured films, coating compositions were made in which the metallic zinc content and the content of the other ingredients (except strontium chromate) of the compositions, to form a cured dry film, were kept constant. Each composition, being a single-package paint, was made by high shearing into 200 wt. parts of the polyol silicate B in the following order: 400 wt. parts of iron phosphide (average particle size of 2–3 microns): 50 wt. parts of zinc oxide (fine pigment grade) 5 wt. parts of finely divided (1 micron) plately talc: 200 wt. parts of dry toluene. Eight compositions were prepared. Strontium chromate was not added to the first composition. It was added in the amount of 1, 5, 10, 20, 40, 80, and 160 wt. parts to the second through eighth compositions. It was noted that all were paintable except the eighth composition to which was added 160 wt. parts of strontium chromate. That composition was too thick to paint.

The first through eighth composition as cured dry films contained calculated from the coating compositions, on a weight percent basis: zinc dust in the amount of 29, 29, 28.8, 28.6, 28.2, 27.4, 26.0 and 23.6, respectively; zinc oxide in the amount of 7.3, 7.2, 7.2, 7.2, 7.0, 6.8, 6.5 and 5.9, respectively; strontium chromate in the amount of 0, 0.14, 0.7, 1.4, 2.8, 5.5, 10.4 and 18.8, respectively; calculated $SiO_2$ (from polyol silicate) in the amount of 3.5, 3.5, 5, 3.4, 3.4, 3, 3, 3.1 and 2.8, respectively; polyvinyl butyryl in the amount of 1.4, 1.4, 1.4, 1.4, 1.4, 1.4, 1.4. 1.3, and 1.2, respectively; talc in the amount of 0.7 down to 0.6, and Ferrophos in the amount of 58.1, 58.0, 57.6, 57.6. 57.2, 56.4, 52 and 47.1, respectively.

The first 7 of these 8 compositions were used to provide a scored film of 0.8-mil thickness on clean 22-gage steel panel. These panels were subjected to the ASTM B117 salt fog test until rust appeared. These coated panels of the first 7 compositions started to rust at 24, 36, 144, 990, 2,100, 3,100, and 4,200 hours, respectively.

Some of these compositions appear to age after a substantial storage time. As a result, for certain compositions of the present invention it is desirable to furnish the composition to the user in the form of a two-package system mentioned earlier. In that case, for the foregoing compositions of this example the zinc dust is in one package and it is added to the rest of the composition, furnished as a second package, just prior to use. This prevents excess passivation of the metal zinc dust.

In a similar series of formulations the zinc dust content was decreased to 14%, keeping the other ingredients in the same relative proportions, with salt fog test results similar—when the coating thickness was 1 mil. At lower amounts of zinc dust than 10% in the cured film the results were less desirable. At higher levels of zinc dust in the cured film (46%), a 1-mil film on a cold rolled clean (not blasted) steel panel was still rust-free after 6,000 hours. A 0.5 mil film (with 10.4% strontium chromate) lasted over 3,000 hours with no rusting even in the scored areas. At a film thickness of less than 0.5 mil, the salt fog protection was less effective. Outdoor exposure of a 0.7 mil film for a period of one year showed no rusting, even in the scored areas. It was also noted that the position of the panel in the salt fog tester had no effect on the performance that was equivalent whether it was vertical or horizontal, or at an angle throughout its surface. Ordinary inorganic zinc films on the other hand change drastically with position in the salt fog apparatus (upper and lower surfaces).

It was noted that at the higher level of strontium chromate (10.4%) very thick (6–12-mil) coatings did not mudcrack. They were not nearly as hard as the thinner coatings or those coatings having lower amounts of the strontium chromate and therefore, had poorer abrasion resistance. It was concluded that, if thick coatings are applied, a lower content of strontium chromate would preferably be used (about 1.5–3% by weight based on the cured dry film), whereas for very thin coatings (e.g., 0.5 mil thickness) a higher strontium chromate content is preferred as better performance is obtained and the hardness is not reduced.

It was further found in similar experiments that the talc was not necessary in the strontium chromate formulations but was necessary and advisable in zinc chromate formulation improving performance greatly. Zinc oxide along with magnesium silicate (talc) had an improving effect on performance particularly when zinc chromate was used as the chromate composition improving salt fog resistance greatly.

The polyvinyl butyral, as an illustrative residual polyol, had a definite promoting effect on the corrosion inhibiting effect, actually extending the period of time before rusting started when strontium chromate was used as inhibitor.

The following example illustrates the rust protection provided by the compositions of the invention containing zinc chromate, zinc oxide and talc as the chromate composition. The illustrative composition is compared with a composition that is identical in weight percent of ingredients except to contain basic zinc chromate instead of zinc chromate.

EXAMPLE 5

Three coating compositions were prepared for comparison. Each contained 200 wt. parts of zinc oxide, 400 wt. parts of polyol silicate B, 100 wt. parts of zinc dust (3 micron average particle size and containing 5% zinc oxide), 600 wt. parts of Ferrophos (2–3 micron particle size), 5 g. talc for suspension, and 200 wt. parts of dry toluene. In addition, the second composition contained 40 wt. parts of basic zinc chromate while the third composition contained instead of basic zinc chromate, 40 wt. parts of zinc chromate (yellow). (Note, in all instances 5 g. talc was used as a suspending agent in the vehicle).

These three compositions were used to provide 1.8 mil scored films on steel that was then subjected to the ASTM salt fog test mentioned above. The first rust was noticed after 24 hours when using the films obtained from the first and second composition whereas, the first rust was noticed only after 2000 hours when using the film from the third composition, namely, that composition containing zinc chromate. The cured films from these three compositions contained, on a calculated weight basis, about 20% zinc oxide, about 5% $SiO_2$ (from polyol silicate B), about 2% polyvinyl butyral (also from polyol silicate B), about 50% Ferrophos, and about 10% zinc dust. The second and third compositions contained about 4% basic zinc chromate and zinc chromate, respectively.

EXAMPLE 6

100 grams of polyol silicate C, 40 g. 2-nitro-propane, 10 g. strontium chromate (jet milled pigment grade), and 200 g. finely divided ferrophos (less than 5 micron) were high sheared together and 200 g. more of polyol silicate C. added. 200 g. zinc dust, 5 microns particle diameter, and 2 g. of pyrogenic silica (Cabosil) were blended in to produce a single package, non-gassing non-hard settling paint having excellent self curing properties when applied as a coating on steel surfaces as a 1 mil dry film protecting from rust and rust undercutting for a period of 3 months in the ASTM B 117 salt fog test.

The polyvinyl butyral residue content of the dry cured film is preferably over 0.1% and performs well up to 8%, or even 10%.

The metallic zinc content is not limited to a low percentage when used with polyol silicate and chromate composition. The higher the metallic zinc content, up to about 90%, the better the performance, particularly in very thin films or for those coatings where exceptional long life is desired. For instance a composition containing 91% (by weight in a 4-mil dry-cured coating) of zinc and 4% by weight of strontium chromate gave a coating which lasted without rusting for over 2 years in the ASTM B117 salt fog test. As a 0.5-mil coating it was at least 5 times as effective when strontium chromate is present than the composition without it. These compositions with strontium chromate are exceptionally protective against rusting even at low film thickness levels.

EXAMPLE 7

300 ml. Polyol silicate C, 450 g. ferrophos, 100 g. zinc dust and 30 ml of 2 nitropropane were briefly high sheared together to make a single component paint and a panel coated, cured and scored to test in ASTM B 117 salt fog. The 1 mil thick coating failed in 48 hours. It was concluded that such a low level of zinc could never be used in actual paint for preventing rusting of steel without the aid of an additional synergestic inhibitor. This is confirmed in the remainder of the example in which increasing amounts of barium meta borate were added with highly increased salt fog resistance. Example 7a was identical to 7 except that an additional 10 g. barium meta borate was added. A coating and panel made identically to 7 passed the ASTM B 117 fog test for only 8 days. Example 7b was identical to 7 except 20 g. barium meta borate was added and failed the salt fog in 12 days. With identical tests using respectively 30, 50 and 80 g. barium metaborate in Ex. 7 the ASTM salt fog time to first rust was 15 days, 21 days, and 30 days exposure to first rust. In the example using the 80 g. barium meta borate, 10 g. strontium chromate was further added and similar films showed a reduction of white zinc rust over those with no strontium chromate. The strontium chromate also provided greater protection against red rust. There was a synergestic effect.

EXAMPLE 8

This series demonstrates the effect of zinc phosphate as an inhibitor in these zinc-polyol silicate compositions. 300 g. of polyol silicate c, 40 g. 2-nitropropane, 100 g. zinc dust and 450 g. ferrophos ($Fe_2P$) were high sheared together to form a single component paint which when applied as a 1 mil dry film coating to a clean steel panel produced a hard coating, which when scored and exposed to ASTM B 117 salt fog test, lasted only 2 days until first red rust. In similar experiments using identical ingredients but with increasing additions of finely divided zinc phosphate, the 1 mil coating gave the following salt fog test results: 10 g. additional zinc phosphate—2 days to first red rust; 20 g.—3 days; 30 g.—10 days; 50 g.—16 days, 80 g.—39 days. It was apparent that substantial amounts of zinc phosphate must be present ot improve protection, but improvement is very apparent even with the reduction in volume of zinc in the dry film. At the very high volume percentages of zinc phosphate in the cured film, strontium chromate improved the inhibition synergistically. In similar experiments, at higher zinc levels in the film greater protection was also noted.

EXAMPLE 9

Zinc phosphate was evaluated in larger amounts in the cured film. 200 g. polyol silicate C and 120 g. zinc phosphate were high sheared together and applied as a coating at a thickness of 1 mil (dry film) to a clean cold rolled steel panel. After curing and scoring, the panel was exposed to ASTM salt fog B 117 test—failing in less than one day. In identical experiments but using increasing amounts of zinc dust in the formulation and applying the 1 mil film and testing in ASTM B 117 gave the following results to first red rust: 10 g. additional zinc dust—3 days; 20 g. zinc dust—11 days; 30 g. zinc rust—23 days; 50 grams zinc dust—41 days; 100 g. zinc dust—98 days, and 150 g. zinc dust-test is still going after 128 days. It was also noted that no white zinc rust appeared in the zinc phosphate containing coatings as it did in the barium meta borate containing inhibitor, exposure tests.

In other experiments small amounts of kaolin, and talc were added to give better suspension and smoother coatings with improved results. The presence of even very small amounts of pyrogenic silica (Cabosil) prevented hard settling of either the pigments or the zinc. A compilation of a large number of these tests revealed that a minimum of about 40 to 50% zinc in the cured film gives about as good a life test when the proper inhibitor is present as films having 80% or more zinc without the inhibitiors. Strontium chromate improves the performance of other red rust inhibitors and visa versa. Many of the other inhibitors improve the performance of strontium chromate inhibitor in the polyol silicate zinc paint composition. Zinc chromate plus calcium and magnesium compounds such as talc, asbestos and calcium carbonate act as coinhibitors improve performance. Barium meta borate, even in amounts much lower than optimum for inhibitive performance in these formulations with zinc and polyol silicates, improved suspension, and inhibited gassing also. Zinc phosphate in large amounts, is a better antirust and is more useful when present in small amounts when other chromate inhibitors were also present.

EXAMPLE 10

200 g polyol silicate D concentrate, 400 g. toluene and 18 g. polyvinyl butyral were heated to 90 C. and 1.7 ml. of 40% zinc chloride in 2 ethoxy ethanol added. After cooling, 300 ml of this binder was blended with 1 g. finely divided chromium oxide green pigment, 20 g. strontium chromate, 1 g. pyrogenic silica, 150 g. zinc flake and 50 g. 2 nitropropane. Upon application, the coating dried to touch in about 1 minute, and cured very hard in a few hours. Another coating was made by brushing the steel to apply a very thin coating filled with voids and allowed to cure. The coating was less than 0.1 mil was extremely flexible and could be formed; it lasted for 3 months in the ASTM B 117 salt fog test without red rust even in the voids but once red rust started bad pitting occurred. It was apparent that a synergistic highly protective action was taking place by the proper use of the inhibitors with the zinc. It was noted however that on aging of the paint containing the zinc chloride that it deteriorated as a protective coating (on aging in the can) whereas in similar experiments without the zinc chloride the deterioration was greatly reduced.

EXAMPLE 11

1 lb. ferrophos, ¾ lb. barium meta borate, 1.2 lbs. polyol silicate D, 1 lb. zinc dust, 50 ml. 2 ethoxy ethanol acetate, 40 ml. of 2 nitropropane, and 2½ g. pyrogenic silica (Cabosil) were blended to yield a paint which was non-settling at first but thickened and gassed on aging. Humidity tests on 2-mil films were perfect after 3 months at 100% humidity. In a similar experiment 30 g. of strontium chromate pigment was added with improved inhibitive (to red rust) synergistic action, particularly when the film was exposed to ASTM Salt Fog tests. The Vol % of the zinc was exceptionally low in this example and hence little protecting was expected. The coinhibiting effect of the chromate is important in obtaining good life protection.

EXAMPLE 12

200 g. polyol silicate E, 200 g. xylene, 100 zinc flake, 80 barium metaborate, 2 g. pyrogenic silica and 30 mil. 2 nitropropane were blended together to form a paint, having protective properties on outside exposure, at film thicknesses of only 0.3 mil. When calcium boro silicate compositions known as Halox CW 221 and CW 22 were added in place of the barium metal borate similar inhibitive action was noted. However it was concluded that the inhibitive strength — in giving longer lasting properties of the polyol-zinc coatings — in this type of inhibitor was not nearly as effective as the chromates — i.e. strontium, calcium, magnesium or zinc chromate plus magnesium silicate, or of using the chromates as a coinhibitor with the barium meta borate or calcium boro silicate.

EXAMPLE 13

500 g. polyol silicate D concentrate which was especially prepared by reacting ethylene glycol and ethyl silicate 40 in a weight ratio of 1.2/3 in the presence of 0.3 ml. concentrated HCl (37%) as catalyst. This mix was mixed with 1000 toluene and 35 g. polyvinyl butyral added. This blend was heated to 80 C. and 5 ml. of a 40 wt. % solution of zinc chloride in 2 ethoxy ethanol added. After cooling this blend, 100 g. strontium chromate, 2.5 g chrom oxide green and 200 ml. of 2 nitropropane were high sheared together and 2 g. pyrogenic silica added to prevent settling. This was one package the other package being 770 g. zinc flake which was added just prior to use. The two package mix was stable for a 12 month period. On testing periodically small aliquots mixed prior to use over this period produced excellent hard coatings, giving exceptional rapid hardness and gave superior protection to ferrous surfaces.

In similar experiments, 8 wt.% clay, based on binder was added to the above mix with good performance results.

EXAMPLE 14

To demonstrate the utility of a two packae system comprising stable blends of the polyol silicate vehicle and suspending agent and inhibiting fillers were prepared as follows: 44 g. air floated kaolin clay, 43 ml alcohol and 30 ml of polyol silicate, 35 g. strontium chromate (jet milled pigment grade) and 30 ml 2-nitro propane were high sheared into: 700 ml more of polyol silicate C to form a non-hard-settling slurry for a 2 package paint — to which various amounts of zinc flake or zinc dust could be added as desired before use. this allows shipment of a ready to use extremely stable binder-vehicle mix to which the amount of zinc dust or flake can be easily compounded or stirred in at will for whatever desired usage is demanded. Similarly in an identical mix an additional 100 g. of ferrophos was sheared into the mix to produce one package (omitting zinc) of a two package system to which zinc dust or zinc flake or other materials can be added prior to use. In another system dispersions of either the barium meta borate inhibitor or the zinc phosphate inhibitor were found to be stable, in the polyol silicate vehicles, with or without the ferrophos pigment. The advantage here is the stability and versatility in the amount and type of zinc pigment added for a particular formulation for coating application. Obviously these zinc free coating packages can be used with other fillers, or as is as a ceramic top coat over the base zinc coat, a system particularly useful for exceptionally long life protection in immersion service such as in fuel tanks or ballaat-salt brine tanks were porous but protective coatings are important.

EXAMPLE 15

Polyol silicate vehicles using less polar solvents meeting rule 66 requirements were prepared by heating 700 ml. of polyol silicate concentrate C having about 25% silica with 400 m. 2-nitropropane, 40 ml. toluene and 600 ml of high flash naphtha, to about 80 C. and adding 60 g. polyvinyl butyral. The resultant binder was compounded with fillers similar to those in preceding examples with similar results.

Another polyol silicate vehicle was prepared by mixing 700 ml. polyol silicate concentrate C. 300 ml. 2 ethoxy ethanol, 400 ml toluene, 200 ml of 2-nitro propane and 500 ml. high flash naphtha, heating to 80 C. and incorporating therein 16 g. polyvinylbutyral. The resulting binder meeting rule 66 requirements performed nearly identically as the other binders in the examples of this invention solvents include alcohol, 2 ethoxy ethanol other hydrocarbon ethers and ketones (methyl ketones such as methyl butyl or methyl amyl ketone). Other diluents include ethyl benzene, cyclohexane, and other hydrocarbons such as kerosine naphthol spirits, naphtha.

It is preferable to have sufficient higher boiling solvent for this polyol silicate rather than a diluent to assure continued solubility of the film as the lower boiling diluents are evaporating during cure.

Some ketones cause gelling if the ratio fo glycol/silicate is higher i.e. over 1 mole or 1.5 mol glycol per SiO unit in the silicate. The nonpolar hydrocarbon solvents such as xylene, toluene are necessary to assure solubility and good suspension of the zinc without agglumeration and hard settling. The solubility of the polyol silicate in hydrocarbon is inversely proportional to the amount of polyol in the silicate composition. At below a mole ratio of 1 polyol OH/ester exchangeable grouping solubility is great. Above this solubility dwindles.

EXAMPLE 16

This example demonstrates improvements in red rust inhibiting activity of the polyol silicate-zinc-strontium chromate-ferrophos vehicle coating by high shearing the strontium chromate, ferrophos and vehicle to obtain a more intimate dispersion and then adding the balance of the polyol silicate and zinc flake without shear to prevent its breakup. These data show that the strontium chromate is most efficient in its rust preventative action if intimately broken up by the sharp ferrophos particles during mixing whereas the zinc flake is most efficient in rust protection if not high sheared to cause breaking up of the flat platelets of zinc.

Thus 100 g. polyol silicate C, 25 g. strontium chromate and 600 g. ferrophos were high sheared together to obtain an intimate dispersion. Varying amounts of zinc flake and 200 g. more polyol silicate C were then stirred in carefully as follows: 17-a. 40 g. zinc-flake to 550 g of the polyol silicate mix; giving a salt fog (ASTM B 117) test to first rust of about 14 days for a 1 mil dry film; 17b 80 g. zinc flake and 17c-120 g. zinc flake was added in each case to a 550 g. portion of the polyol silicate sheared mix to produce 1 mil coatings which respectively lasted over ½ months and are still aging in the salt fog without rust. The zinc content was calculated at only 17 and 27% zinc based on solids in the coating.

When mixing was not carried out as above the 1 mil coatings lasted about 1 week in the ASTM B 117 salt fog test.

It was also observed that minor amounts of organic acids such as benzoic succinic etc. greatly deteriorates the inhibitive effect of the chromate essentially destroying their action if not neutralized and removed. If the zinc flake has an acid lubricant on its surface it should either be neutralized or a buffering pigment such as barium metaborate added to keep the coating from rusting prematurely.

EXAMPLE 17

200 g. polyol silicate E, 200 g. xylene, 100 g. zinc flake, 80 barium meta borate, and 8 g. 8 g. nitrobenzene were blended together. 2 g. pyrogenic silica (Cabosil) was blended in to make a stable, non-hard-settling single component paint giving protection for cold rolled steel surfaces.

In a similar test the addition of 10 g. strontium to the above formula had a synergestic protective effect on preventing red rust. In this and other tests it was noted that generally the barium meta borate and strontium chromate were highly synetgestic in anti rust protection with the zinc-polyol silicate system. The calcium boro silicate inhibitor was not as effective as the strontium chromate. The zinc chloride-strontium chromatechrom oxide co-inhibitor was touchy and deteriorated on aging and may have to be applied as a 2 pkg.. Talc or iron oxide plus zinc chromates gave excellent coinhibitive protection.

EXAMPLE 18

The red lead-calcium carbonate co-inhibitor paint was formulated as follows: 300 g. polyol silicate E, 300 g. finely divided dry calcium carbonate, 25 g. netrual talc, 500 g. zinc dust and 50 g. red lead oxide were blended together and applied as a one mil film to cold rolloed steel panels; the film protected for a period of 3½ months without red rust whereas if the red lead were left out of the coating it lasted only 1½ months, and if the calcium carbonate was omitted lasted only 1 month in the ASTM B 117 salt fog test. The red lead did not appear as compatable with the strontium and calcium chromate inhibitors and on occasions may cause them to fail if present in sufficient quantity to render the chromate insoluble.

EXAMPLE 19

A co-inhibitor paint was prepared from the co-inhibitor zinc chromate and red iron oxide, zinc dust, ferrophos (Fe$_2$P) and a polyol silicate. The polyol silicate was prepared by heating to 110 C. 1,088 g. ethylene glycol, 2,730 g. ethyl silicate 40, 850 g. 2-ethoxyethanol and 1 g. 37% hydrochloric acid. Upon cooling the polyol silicate was analyzed, finding 23.6% silica and having a glycol/silicate (SiO) ratio of 0.9/1. This product had a shelf life at 70-80 F. of over 4 years. (Called 18C.)

To make the finished binder, 1000 ml of the concentrate, 2000 ml toluene and 120 g. polyvinyl butryal were heated to 85 C.. The resultant binder on cooling was analyzed, finding 8 wt % silica and 4 wt % polyvinyl butyral. (Binder called 18B).

To make the finished paint 300 ml of Binder 18B, 600 g. finely divided (less than 3 micron) ferrophos, 50 g. finely divided red iron oxide pigment and 10 g. finely divided zinc chromate were high sheared into the mix. 100 g. zinc dust was blended in make the final finished paint. Coatings were applied to cleaned cold rolled steel panels by dip, spray, flow on, and brushing techniques finding all very satisfactory. The coating material was very stable after 1 year storage, yet when applied as a thin coating on clean steel was strongly adhesive, hard and highly protective, in the ASTM B 117 Salt Fog test, for 3000 hours at 1 mil thickness, dry film. The hardness of the coating was 4H -pencil. The adhesion was excellent.

In other formulations made similar to the above, an additional 30 ml. of Concentrate 18C plus 60 ml xylene was added with an improvement in performance.

In other formulations another additional 30 ml 18C and 60 ml xylene were added with improved performance.

EXAMPLE 20

In this series a synergestic effect of co-inhibitor strontium chromate plus calcium silicate in the polyol silicate zinc paint was noted. To make the paint 6 g. of strontium chromate, 200 g. of the polyol silicate concentrate, made as in example 13, 330 g. iron phosphide, 150 g. zinc dust were high sheared together to make a stable homogeneous mix called 19-1. In similar experiments 19-1 was repeated with the addition of the following amounts of silicates — 19-1a 10 g. calcium silicate (which was calcined and extremely finely ground powder); 19-1b 20 g.; 19-1c 40 g; 19-1d 80 g.; 19-1e 160 g.; at the latter addition the mix was getting thick so 335 ml. xylene was added and designated 19-1f; 19-1f was repeated with the additional incorporation of 20 g. of 10% montmorillonite in xylene. Portland Cement was also used as the source of Ca silicate.

Each of the above formulations was applied to a 20 gauge 3×6 inch clean cold-rolled steel panel at approximately 0.7 to 1.9 mil dry film thickness. After 3000 hours in the ASTM B 117 salt fog test, all of the panels containing the strontium chromate were acceptable, however those without the strontium chromate were not. It was also noted that when both the strontium chromate plus the calcium silicate was present a much harder coating resulted and the calcium silicate acted as a water scavenger to prevent gassing and aggulumerating of the zinc dust as a hard lump on the bottom of the paint can after long aging.

EXAMPLE 21

In this series the synergestic effect of PbO - calcium carbonate and magnesium silicate as coinhibitors for the polyol silicate zinc paints is shown; also the coinhibitor effected strontium chromate with the other coinhibitors is demonstrated. The Pbo-CaCo$_3$ and talc coinhibitive compositions are interior to those containing chromate mixed in as a second coinhibitor.

To make the zinc paint 1000 ml of the binder from example 18 was blended with 750 g. micron size calcium carbonate, 60 g. talc 1,250 g. zinc dust and lead oxide (PbO) added as follows: #20-o no lead oxide added: 20-a 100 g; 20-b 200 g; 20-c added additional 110 ml polyol silicate concentrate (18c) and 300 ml xylene; 20-d 100 g PbO to make a total of 300 g. PbO added all together; and 18-f added to 20-o-120g strontium chromate. In each case the formulation was high sheared in a Waring Blender and applied to a 3×6 clean cold rolled steel panel to form a 0.7 to 1 mil dry film thickness, and then the remaining paint mixed with the new addition. It was noted that the strontium chromate turned the coating very bright yellow, otherwise the coatings were gray. All of these coatings had exceptional properties, being hard and adhesive and particularly long life without red rust in the salt fog (ASTM D 117 test) for greater than 3000 hours, using a scored panel. In another series the magnesium silicate was left out giving nearly as good results.

EXAMPLE 22

In another series the polyol silicate was prepared by using PbO as catalyst instead of the acid. The resultant coating when evaluated in all of the preceeding runs was softer and poorer than if made with the acid catalyzed (trace) catalyst but a coating could be made having poorer hardening properties, less adhesion and being slower curing. An example of the PbO catalyzed reaction of ethylene glycol and ethyl silicate 40 follows; 1000 g. ethyl silicate 40, 300 g. ethylene glycol and 50 g. PbO pigment were heated with stirring to 115 C. at which temperature a vigoro reaction took place which was then cooled and dissolved in an equal volume of xylene to form a stable binder. Coatings were made by blending 2 wt parts zinc dust and 1 wt part binder, applying on clean steel panels to approximately 1 to 2 mil thickness (dry film). The softer coatings had moderately good protection in the salt fog (ASTM B 117 tester). Considering the high zinc content- the performance was not as good as the trace acid catalyzed polyol silicate. It is slow curing poisenous.

EXAMPLE 23

In this series I demonstrated again the co-synergestic qualities of red lead and calcium carbonate on the polyol silicate zinc dust coatings. In these experiments substantial quantities of red lead were used. To make the zinc paint, 400 ml. binder (18B) from example 18, 300 g finely divided, precipitated and dried calcium carbonate (submicron size), 25 g submicron talc (platy type) and 500 g. zinc dust were mixed and applied as a coating of 0.5 to 1 mil dry film thickness. This coating was called 22-1. Subsequently the following paints were prepared as above but with varying amounts of sub-micron red lead pigment added as follows: 22-1A 10 g; 22-1B 20 g; 22-1C 40 g.;. All of these coatings were hard and adhesive and gave long lasting protection (over 2000 hrs) in the salt fog test, the ones with higher red lead being superior on the basis of zinc content. In another series 22-1c was repeated but an additional 40 g. concentrate 18c from experiment 18, 18 ml toluene and 15 ml of 2 nitropropane added. It was noted that increasing the silica content increased the rust free life performance in the salt fog and outdoor exposure. This was called series 22-1d.

Another series 22-1d was modified by adding 40 g. additional red lead and 40 g. concentrate 18c with even increased rust free life in out door exposure test. Called series 22-1e.

Another series 22-1o was modified by adding 40 g. concentrate 18c and 30 ml xylene to form a coating having even improved rust inhibiting protection at 0.5 to 1 mil thickness in outdoor exposure and in salt fog tests. I have demonstrated here that the silica deposited from the polyol silicate acts synergestically with the red lead and calcium carbonate in the presence of the zinc dust to give even longer rust free life. The solids content of the coating was calculated to be; 1.5% poly vinyl butyral, 7% silica, 28% calcium carbonate, 2.3% talc, 46.4% zinc dust and 14.9% red lead oxide. Red load oxides in the zinc paint is not in inhibitor of rust, but only when properly mixed with adequate polyol silicate in the presence of Ca and Mg fillers, zinc and with chromate cmpds, apparently perform. The reason for this is not known but may be due to the forming of plumbates or plumbites. Pb inhibitors are inferior however (PbO) is quite active as an inhibitor, as is the red lead oxides. The commercial lead glasses and lead dioxide are less reactive and useful in this system. Some of the leady oxides which are mixes of metallic lead and alloys and PbO. It is suspected that the lead compounds react with the polyol silicate to give the improvement in performance against red rust. The lead containing compounds have an additional advantage of having antifoulant characteristics , particularly against barnicles, grasses, and growths on under-salt-water-steel-structures. The compounding of the coating formulations with even higher ratios of polyvinyl butyral increases the life of the coating in flowing salt water tests.

EXAMPLE 24

This series demonstrates the co-inhibitor, zinc chromate, plus magnesium silicate in the polyol silicate-zinc dust paints. To make the coating material the polyol silicate was first prepared by heating to 110C, 8y moles ethylene glycol (496g.) and 1 gram mole of ethyl silicate 40 (700 g) together in the presence of 0.3 ml. conc. Hcl acid catalyst. The product having 23 wt% silica is designated 23C. To make the paint, 100 ml of 23C, 20 g. zinc chromate, 200 g. zinc dust, 20g. zinc oxide, 300g. sub 3 micron iron phosphide, and 5 g. submicron platey talc were high sheared together and applied as coatings to steel panels in 2 series — one 0.6 to 1 mil dry film thickness and the other 2.5 to 6 mils. The coatings were hard and adhesive, did not mudcrack, peal or become brittle; After 6000 hours in the salt fog (ASTM B 117) all of the coatings were still rust free, even in the scored and void areas. Outdoor exposure for over 2 years showed no rust or rust undercutting. The paint itself was not as stable as those having a lower glycol/silicate unit ratio (ie. lower than 0.9/1) demonstrated in the other experiments herein. The paint gelled solid after several days in a paint can.

In a similar series, 50 g. zinc oxide, 10 g. talc and 50 g. zinc chromate were substituted into the above formula in place of the given amount, giving a coating lasting over 5000 hours in salt fog ASTM B 117, without any red rust; however when the amount of zinc chromate was reduced to 5 g. the coating went bad in a month and with 10 g. zinc chromate lasted about 3 months in the ASTM B 117 salt fog prior to red rust. This shows the importance of the Zinc Chromate and the levels needed. In similar tests the talc was omitted with premature failure, showing the synergistic effect.

EXAMPLE 25

A co-inhibitor paint was prepared from the co-inhibitor zinc chromate plus calcium carbonate, and the polyol silicate -zinc dust or zinc flake paint. Here 200 ml. Binder 18B from example 18 was high-sheared with the following finely divided pigments and fillers — 40 g. zinc oxide, 40 g. zinc chromate, 600 g. ferrophos, 400 g. zinc dust and 400 ml toluene added. To this mix varying amounts of Calcium carbonate were added as follows:

24 –1o none; 24–1a - 5g.; 24–1b - 10g.; 24–1c - 20g; 24–1d - 40g.; 24–1e - 80g.; 24–1f —added 60 g. zinc phosphate. It was noted that coatings 24–1o thru 24–1d were fast curing, hard and adhesive. All of the coatings having calcium carbonate in them gave good coatings having superior salt fog resistance to red rust.

In a similar experiment only 10 g. calcium carbonate was added along with 20 g. zinc chromate instead of the amounts specified —all else being the same —giving a coating having excellent protective properties.

EXAMPLE 26

In this 2nd series of the demonstration of the co-inhibitive effect of zinc chromate plus magnesium silicate — in the polyol silicate-zinc system, — 200 ml binder 18c (from Ex 18) 40 g. zinc oxide, 600 g. ferrophos, 400 g. zinc dust and 400 ml toluene were high—s-heared together in a Waring Blender and the following amounts of submicron platey talc high sheared into the mixes as follows: 25-1 none; 25-1a - 5g.; 25-1 - 10g.; 25-1c - 20g.; 25-1d - 40g.; the coatings were each applied as ½ to 1 mil dry films to 3×6 cold rolled steel panels. Salt fog test on all panels having both magnesium silicate and zinc chromate, were perfect after 2000 hours. It was also noted that the paint blend was stable as a single package primer, not gelling, although settling some over long periods of time.

EXAMPLE 27

In this series, an inhibitor of aluminum chlorohydrate plus the polyol silicate - zinc paint was used to form coatings (1 mil) dry film on clean cold rolled steel panels. Thus 7 g of a 50% solution of aluminum chloro hydrate in water was mixed with 20 g. 2 ethoxy ethanol and 100 ml of polyol silicate conc. having a glycol to silicate ratio of 0.8/1 and a hydrolysis and condensation of 40%. The mix was cloudy at first but cleared on standing. It was calculated that the co-product had 26.6% silica, was 54% hydrolyzed and contained 2.75% aluminum chlorohydrate reacted therein (called 26B). To form a paint 20 g of 26B was blended with 35 xylene and 70 g. zinc dust and applied as a thin coating, because, if thick, mudcracking often occurred. The coating was highly protective in long salt fog tests although quite efflorescent in appearance on aging. The paint was unstable on aging. While the aluminum chlorohydrate causes rapid curing, it will also cause gelling if the hydrolysis of the binder is above about 40%. Monomers and dimers are better reactants.

EXAMPLE 28

In this series, higher hydrolyzed binders were prepared from polyol silicates having ratios of glycol OH to alkoxy on the silicate of from 0.5 to 0.9 to 1. These were prepared making the polyol silicate and then adding water to give the hydrolysis desired. It is assumed, of course, that hydrolysis of the polyol silicates always occurs in the presence of water from the solvents and fillers. For this reason the polyol silicate is a good scavenger for water and thereby prevents gassing. Hydrolysis and condensation levels of 42%, 45%, 47%, 50% and 54% were achieved and paints make from these polyol silicates dissolved in xylene and other hydrocarbon solvents, by adding zinc dust or flake in a ratio of about 1 binder to 0.5 to 5 zinc and other fillers. It was again shown that at the higher hydrolysis lower polyol ratios are desired and visa versa. This was shown in earlier patent applications. These ratios are all satisfactory for making the coinhibitor-polyol silicate paints, that have single package characteristics, although of limited shelf life. At lower hydrolysis levels i.e. below about 40% there is no concern for pot life provided the polyol OH to silicate monofunctional grouping is below about 1.3/1 and preferably about 1/1 and there is sufficient monofunctional hydroxyl compound present to stabilize the mix. At higher levels there is a tendency toward gassing and gelling, but they make fast curing excellent 2-package zinc paint systems, with the zinc in one package and the other ingredients in the other package.

EXAMPLE 29

In this series, barium compounds, particularly barium carbonate and barium sulfate were used as inhibitors with the polyol silicate in the zinc paint formulations. In addition, the combination of barium compounds plus strontium and or zinc chromate was shown to have inhibiting properties, along with other magnesium and calcium fillers. The best combination was zinc chromate plus magnesium and calcium fillers such as the silicates and carbonates. To make the paint, 530 g. polyol silicate binder which was 43% hydrolyzed and condensed, had a ratio of 0.6 mole glycol/mole SiO unit in the silicate and contained 10.1% silica as $SiO_2$ and 1.2% polyvinyl butyral. It was prepared by heating ethyl silicate 40, glycol and a trace of strong acid catalyst to 105C, then adding water and polyvinyl butyral to the amount given above. The binder was dissolved in sufficient toluene to adjust the silica content to 10.1% and the following fillers were high-sheared into it with a Waring blender; 500 g. iron phosphide, 30 g. strontium chromate, 500 g. zinc dust and 90 g. finely divided-precipitated barium carbonate and 2 g. pyrogenic silica (Cabosil) added to inhibit hard settling. Coatings applied to clean steel panels at 0.5 to 1 mil were highly protective over a 6 month period in the ASTM salt fog test apparatus.(B117)

When barium carbonate and sulfate are used with the zinc and polyol silicate without additional inhibitors, a synergestic inhibiting effect on red rust formation may be due to their reacting with the silicate to form a more conductive matrix for the zinc and hence move galvanic protection.

EXAMPLE 30

The most outstanding coatings in long life protection in the salt fog are those having high zinc, high polyvinyl butyral and contain a strontium chromate inhibitor along with sufficient polyol silicate. An example is a mix containing 2000 kg. zinc dust, 300 g polyol silicate (23% silica and made from monomer 1.3/1), 208 g polyvinyl butyral, 834 g. MEK and 101 g Strontium chromate. Panels applied with this mix at only 0.3 mil dry film were still rust free after 8000 hours even in the most heavily scored portions.

In similar experiments formulations were made to have the compositions — based on cured film: 20 to 26% polyvinyl butyral, 0 to 40% silica, 20 to 52% zinc dust and 11 to 26% strontium chromate. All coatings having at least 4% silica passed the ASTM Salt fog test for 6000 hrs with no red rust at a dry film thickness of 0.5 mil.

In another similar series the compositions in the cured film were 78% zinc, 7.5% strontium chromate and 7.5% polyvinyl butyral and 7% silica deposited from the polyol silicate — giving a protective coating of only 0.3 mil which lasted over 8000 hours in the ASTM B 117 salt fog test.

In another similar series the cured coating having a composition of 76% zinc flake, 5% strontium chromate, 0.1% $CrO_2$ green, 12% silica and 6% polyvinyl butyral gave outstanding life in the salt fog tests at only 0.3 mil thickness, lasting over 6000 hours.

It was also noted that while zinc chloride salts appear to activate the coating protection if applied relatively soon, the opposite effect is noted if the chloride and strontium chromate age for long periods with the binder and zinc — serious problems occur in its ability to protect, due to red rust formation and pitting caused by this action. It is thought that any electrolyte will set up an electrolytic cell in the paint-can to cause some of the inhibitors, fillers and zinc to possibly deliteriously react in some instances while favorably reacting in other cases, to produce more long life coatings when applied as paint.

Among the heavy metal compounds pigments found useful with the polyol silicate - zinc formulations, include PbO, red lead oxides, lead silicates, and plumbates powdered lead and lead alloys higher than iron in the electrochemical series, barium carbonate, barium sulfates, oxides and silicates.

Among the metal compounds found useful in the polyol silicate coatings as a coinhibitor along with zinc, calcium, and magnesium and strontium chromates included red iron oxide, calcium and magnesium silicates end carbonates, and zinc oxide and hydroxide. I have found it preferable to have a relatively high amount of amorphous silica present deposited by the polyol silicate which in some way enhances the protective action. Also the presence of the polyvinyl butyral enhances the inhibitor action.

I have also found that I can tolerate small amounts of silica from collodial silica in the polyol silicate if I adjust for the amount of water usually present in the collodial silica solutions by causing it to react to hydrolyze further my polyol silicates. In this case the polyol silicates used should be of low hydrolysis to allow the incorporation of water by hydrolysis and yet end up with the polyol silicate having less than about 55% hydrolysis and preferably below about 42% hydrolysis for single package formulations. Colloidal silica is less expensive than alkyl silicates and a certain amount can be incorporated in the binders advantageously. The colloidal silica sols having alumina deposited on their surfaces may also be used and incorporated into the polyol silicate vehicles used with these formulations.

The polyol silicate binder having a low number of connected siloxane linkages is most useful and effective as a single package binder in zinc dust-inhibitive paints when the ratio of reactive polyol OH/reactive ester exchangeable groupings on the silicate is about 0.5 to 1.3 with the ratio of about 1/1 being about optimum for stability and particularly faster curing. Compensation should always be made for the minor amounts of moisture present in the fillers, solvents, inhibitors and zinc which will change the ratio, so this should be corrected for prior to manufacture of single package paints of this invention and the amounts of monomeric silicate to incorporate with the polymeric siloxanes to achieve the average optimum hydrolysis level in the finished paint and the optimum ratio of polyol OH to monofunctional reactive ester exchangeable grouping on the silicate or siloxane. SiO groups should be lower than 7 for absolutely stable single package compositions. For 2 package zinc-polyol silicate paints, higher ratios of polyol OH/monofunctionalester-exchangeable grouping on the siloxane, such as 1 to 2 polyol groupings per each monofunctional ester exchangeable grouping on the siloxane. For the higher polyol ratios the pendant polyol groupings having only one of the OH groupings on the polyol are attached to the silicon atom.

Regarding polyvinyl butyral or other large multi hydroxyl containing molecule addition to the polyol silicate, I have found that the stability of the resultant co-product to gelling is dependent upon the acidity of the mix, strong acids and heat to over 100 C. catalyze excessive reaction of the OH groups with silicate molecules which may cause gelling if the proper ratios are present and the molecules are large and multifunctional, however if neutral or slightly basic the reaction is minimal. When using polyvinyl butyral or other polyol it is preferable to use the lower ratios of polyol/silicate groupings given above to prevent gelling as a single package paint. The most reactive yet stable ratio for polyol silicates having up to about 7 or 8 siloxane linkages is about 1 reactive OH grouping on the polyol per each reactive monofunctional grouping on the siloxane, so keeping the ratios at about this level is advisable. At lower ratios the polyol silicate products are more soluble in nonaromatic hydrocarbons as well as all the other solvents, but they are slower curing. With polyvinyl butyral present in the paint a blend of oxygenated solvents and hydrocarbons is required.

While the actual reason for the chromate activity in preventing red rust in polyol silicate-zinc coatings is unknown, it may be due in part to its constant presence in the porous zinc-silicate film, becoming just soluble enough to percolate through the film to the steel surface to constantly passivate it and thereby slow down the zinc-steel galvanic activity of the cell. As the coating ages, the chromate if it is too soluble in water will soon be washed away and passivation will cease; and if too insoluble of course no passivation will occur. A balance is necessary for extensive rust free life which is dependent on the solubility of the chromate ion, the amount of zinc in the cured film, the porosity of the film which may increase or decrease percolation of the electrolyte containing the chromate ion to the steel surface, and film conductivity and the influence of other co-fillers which may react with the chromate ion during it percolation through the film on aging to either increase or decrease its solubility and activity as a passivator.

The combination of the zinc oxides and hydroxides oxidation and hydrolysis products from the aging of the zinc also passivates the steel surface. Completely inert fillers such as iron phosphide slow down the leaching and percolation of electrolyte thru the physical reduction of the porosity of the coating. The silica deposited from the polyol silicate greatly increases porosity and with the polyvinyl butyral, which decreases porosity, forms a nearly perfect matrix or binder for the zinc, chromate, reactive fillers or coinhibitors, and no-reactive fillers. In addition the polyol silicate acts as an inhibitor for the zinc degradation and slows down coating activity.

While the reasons for the unexpected improvement in rust free life of steel surfaces coated with the single package paint comprising the co-inhibitors, polyol silicate, zinc and vehicle is unknown, the value of such a paint is demonstrated in this invention for providing ease of use, rust free protection, all weather application without fear of destroying the coating, providing a good base primer for epoxy polyamide, acrylic, vinyl, polyurethane and other organic coatings, preventing rust undercutting, and providing weld thru properties without burnback. In addition the ease of versitility of formulation for use to provide a variety of types of rust preventive coatings ranging from a preconstruction primer to a thick mudcrack-free coating, low cost-low zinc formulations, flexible coil coatings, solvent insoluble coatings for tank linings, high temperature coatings, antifoulant-antirust co-coatings, ceramic topcoats and coatings that can be applied by roll-on, dip, flow on, brush and air or airless spray, in any weather or temperature.

With soluble phosphates present it may be used over nonsandblasted steel surfaces - even without zinc in the film itself, although this is not as desirable or preferred.

I have found that a co-inhibitive effect occurs when minor amounts of the reactive fillers are present with the particular chromate. For example, zinc chromate plus Mg & $CaCO_3$ and silicates, give excellent combinations as does barium carbonate or sulfate and strontium chromate. In these formulas porosity is necessary to keep a constant percolation of the electrolyte and flow of the chromate to the steel. Proper use of synergestic reactive fillers with zinc chromate is used to produce the good effect. These fillers are preferably those that are mostly insoluble and higher than zinc in the electrochemical series. Hence aluminum, magnesium, strontium, calcium and berrillium compounds (fillers) may be advantageously used with the zinc chromate to produce the desired effect, whereas with inhibitors higher than zinc in the electrochemical series, such as calcium, magnesium and strontium chromates, higher levels of polyvinyl butyral or similar substance may be used to slow down the percolation of electrolyte thru the coating causing premature leaching or using up the chromate causing premature failure. If, however, excessive polyvinyl butyral or inert filler is used with a less soluble chromate, barium chromate, then not enough chromate may be present to either make the polyvinyl butyral conductive or to passivate the steel surface and may even be too low to give good long life rust free protection with the zinc.

A balance is necessary to achieve chromate passivation and conduction throughout the life of the coating. The conductance of the coating may be increased by addition or reaction of lead oxide, barium or calcium compounds with the polyol silicate in the film, although not preferred. An improved way of improving conduction of the coating and more rapid curing is to add to or react with the polyol polymer a very small amount of acid such as phosphoric acid while in solution in a solvent and prior to the addition of the zinc and the polyol silicate, and in a preferred range of from 0.01 to 5% based on the polyvinyl butyral of the phosphoric acid or similar acidic material, which may be heated optionally to cause reaction, after which either zinc dust kor a basic metal compound higher than iron in the Chemical series can be added to neutralize the resultant product prior to addition of the polyol silicate. It has been shown in previous U.S. Pat. No. 3,917,648 and other reference applications given herein that when substantial amounts of an acidic or acidic salt material is added to or reacted with the polyol polymer such as polyvinyl butyral, very small amounts (ratios) of glycol/silicate alkoxy grouping is necessary to achieve a cure. While certainly not preferred, inferior coating can be made without any aliphatic polyol, but only containing the polyol polymer an alkyl silicate or alkoxy alkyl silicate, zinc particulates a corrosion inhibit or and the vehicle, provided an acid or acid salt has been incorporated in the polyol polymer (such as polyvinyl butyral). When tetraethoxy silane, and siloxanes having fewer than about 8 SiO groups per molecule, stable single package systems can be made, however they are very slow curing as compared to the polyol silicates containing products, but may be used where such slow cures are not deleterious. The addition of very small amounts of aliphatic polyols to the silicate greatly reduces the cure time in these types formulations containing the curing accelerators.

EXAMPLE 31

This series demonstrates formulations containing very small amounts of polyol and no aliphatic polyol reacted with the silicate, but using an acidic material or acid salt to the poly vinyl butyral as an accelerator for curing. Thus 25 lbs of tetra ethoxy silane, 18.9 lbs 2 ethoxy ethanol, 0.05 lbs HCl (37%) were heated together to 80 C. and 75 lb zinc dust blended in. To this blend was then added a mix of 12 lbs. polyvinyl butyral in 24 lbs of 2 ethoxy ethanol which had been heated to 80 C with 0.15 lbs phosphoric acid. The final blend tested in a paint took several days to cure hard. In an nearly identical experiment the filler solids of the formulation was increased to 125 lbs zinc dust and 75 lbs ferrophos and 2 lbs strontium chromate added. The paint blend was very slow curing but cured well in about 4 or 5 days to a hard adhesive coating.

In a second series ethyl silicate 40 having an average of 5 SiO groupings per molecule was substituted for the Tetra ethoxy silane — keeping the $SiO_2$ content of the binder identical by blending with the appropriate amount of 2 ethoxy ethanol, and blending in the other ingredients in the same proportions as in the 2 first series. The paint blend was very slow curing but cured well in several days to a hard adhesive coating.

In a third series minor amounts — ie 0.5 moles OH of ethylene glycol per each alkoxy grouping on the silicate was substituted in the above 1st and 2nd series in place of the untreated tetra ethoxy silane and the Ethyl Silicate 40 with greatly improved cure rates — ie about 1 day.

In a fourth series the silicate from series 1 & 2 was hydrolyzed to about 54% and treated exactly as in series 1 and 2. Here the coating cured well in about 2 days but the pot life of the paint lasted only a few months and hence could not be used as a single package. Other accelerators include $ZnCl_2$.

EXAMPLE 32

In this series preferred examples of long aging single package formulation have very rapid hard cures are given. Thus 430 lbs ethyl silicate 40, (having 40.2% silica) 570 lbs condensed ethyl silicate (containing 97% monomeric silicate), 566 lbs glycol 100 lbs 2-ethoxy ethanol and 0.5 lbs hydrochloride acid (37%) we mixed and heated to reflux. The solution became clear at 64° C. The resultant polyol silicate has 20.1 wt.% silica, a mole ratio of glycol OH to alkoxy grouping on the silicate of 1/1, and had an average of 2.83 SiO groupings per molecule. Forty lbs of the polyol silicate was blended with 6.6 lbs of a solution of 2.2 lb of polyvinyl butyral in 4.4 lbs of 2 ethoxy ethanol and heated to 70 C. and 200 lbs zinc dust and 3 lbs of strontium chromate blended in. ½ lb of an anti sag agent was added. This paint was split into 2 equal portions 32-1 and 32-2. To 31-1 was then added 20 lbs of 2 ethoxy ethanol and to 32-2 was added 20 lbs toluene. The products were very stable as single package primers, yet cured very rapidly on application. Paint # 32-1 was particularly useful in maintenance coatings and for ships, while 32-2 was very rapid drying, and was therefore more useful as a pre-construction primer on shot-blasted steel.

In a 2nd series, it was found that by increasing the SiO content of the siloxane to 4 SiO groups per molecule average and keeping the polyol OH/EtO group on the silicate at nearly the same, an even faster curing material resulted.

EXAMPLE 33

Pentaerithrytol by itself is insoluble in silicates but when reacted in the the presence of a solvent such as ethylene glycol, reaction is rapid. Thus 186 gram ethyl silicate 40, 63 g. ethylene glycol, 17 g. Pentaerithrytol, 15 g. ethoxy ethanol and 0.15 ml. HCl (37%) where heated to 103 C. The solution was clear. A paint was made with the above binder by mixing 30 g. binder, 20 g. xylene, 60 g. Iron phosphide, 60 g. zinc dust and 4 g. strontium chromate — in a Waring Blender. The paint cured well on cold rolled steel panels, and was very protective for long periods in the ASTM salt fog test. (6 months at 95 F 5% salt) for a 2 mil scored film.

In a second series, using pentaerythritol, 5 wt % was added to an ethylene glycol -2ethoxy ethyl polysilicate (or siloxane) which was 40% hydrolyzed and condensed and which binder was dissolved in 2 ethoxy ethanol to a level of 10% silica present. The ratio of ethylene glycol OH to 2 ethoxy ethyl groupings on the silicate was 0.7/1. The addition of the pentaerithrytol (added at 100 C.) greatly improved the hardening rate of the resultant zinc coating in formulations given as examples in this invention.

EXAMPLE 34

An excellent highly preferred non settling, highly protective, single package zinc paint was made as follows: 200 lbs of 2 ethoxy ethyl silicate (containing an average of 5 SiO groups per molecule, having 19 wt % silica and being 40% hydrolyzed and condensed) was mixed with 51 lbs ethylene glycol and 0.23 lbs of concentrated hydrochloric acid and heated to 140 C. and 123.6 lbs of a 9.1 weight % polyvinyl butyral solution in 2 ethoxyethanol added along with ½ lb of zinc dust to scavenge out any excess free acid and prevent gelling. The binder had the following properties: Flash Poin by Pensky Martin closed cup- 104 F., contained 10.1 wt % silica as $SiO_2$, 3% polyvinyl butyral, and was 40% hydrolyzed and condensed. A paint was made as follows: 50 lbs of the above polyol-2 ethoxy ethyl silicate, 75 lbs zinc dust (2-10 micron) 50 lbs iron phosphide (2-3 micron, 10 lbs of a 10% solution (gel) of Bentone 14 in xylene and 2.8 lbs strontium chromate were blended together in a reactor. The paint weighed 17.72 lbs per gallon. It gave an excellent coating, being highly protective in the salt for tester (ASTM) for over 6 months as a 2 mil film on cold rolled steel. While the paint performed excellently, it sagged badly in thick coatings; the sag was eliminted by adding 1wt% Caledria asbestos 244 based on the liquid binder portion.

EXAMPLE 35

372 grams of ethyl silicate 40, 124 grams ethylene glycol and 52 g. neopentyl glycol were mixed and 0.3 ml of conc. HCl (37%) and 30 g. 2 ethoxy ethanol added and the mix heated to 99 C. The solution became clear at 65C. The paint was tested by blending 73 g of this binder, 140 g. zinc dust, 250 g. in phosphide, 12 g. strontium chromate and 50 g. xylene. The resultant paint was easily applied, cured well and was highly protective in the ASTM salt fog test performed on 2 mil dry on coated cold rolled steel panels.

I claim:
1. A coating composition containing:
   (1) metallic zinc in particulate form;
   (2) a corrosion inhibitive composition selected from the group consisting of a mixture of zinc chromate and a finely divided magnesium silicate, a mixture of zinc chromate and a finely divided calcium silicate, a mixture of zinc chromate and a finely divided magnesium carbonate, and a mixture of zinc chromate and a finely divided calcium carbonate;
   (3) an aliphatic polyol silicate; and
   (4) a liquid organic vehicle;
   said coating composition containing from about 4 to about 95% by weight of said metallic zinc, from about 1 to about 80% by weight of said corrosion inhibitive composition, and from 1% to about 70% by weight of said aliphatic polyol silicate, said weight percentages being based on the coating composition without said liquid organic vehicle;
   said aliphatic polyol silicate being a solvent soluble, ester-exchanged reaction product of (1) an organic silicate consisting essentially of ortho silicates having ester-exchangeable groups 1 to 6 carbon atoms, said ester-exchangeable groups selected from the group consisting of alkyl, hydroxy alkyl, alkoxy alkyl, and hydroxyalkoxy alkyl; siloxanes thereof, and their mixtures and (2) an aliphatic polyol that is ester-exchangeable with (1), said aliphatic polyol silicate reactants present in amounts providing a ratio of about 0.05 to about 1.9 moles of hydroxyl groups of (2) per mole of ester-exchangeable group of (1).
2. The coating composition of claim 1 further containing finely divided iron phosphide in an amount of about 1 and about 70% by weight as based on the coated composition without said organic vehicle.
3. The coating composition of claim 2 wherein said iron phosphide has an average particle size of less than 5 microns.
4. The coating composition of claim 1 wherein said metallic zinc in particulate form is zinc dust having an average particle size of less than 10 microns.
5. The coating composition of claim 4 further including finely divided iron phosphide in an amount of about 1 and about 70% by weight as based on the composition without said organic vehicle.
6. The coating composition of claim 5 wherein said iron phosphide has an average particle size of less than 5 microns.
7. The coating composition of claim 1 wherein said aliphatic polyol is ethylene glycol.
8. The coating composition of claim 7 further containing a polyvinyl alkylal, the weight ratio range of ethylene glycol in said polyol silicate to said polyvinyl alkylal in said coating composition being between 0.2:1 to 20:1.
9. The coating composition of claim 8 wherein said polyvinylalkylal is polyvinylbutyral.
10. The coating composition of claim 1 which said aliphatic polyol and silicate reactants are based on a ratio of (1) and (2) in which there are about 0.05 and 1 moles hydroxyl group of the polyol per mole esterexchangeable grouping on the silicate.

* * * * *